United States Patent [19]

Losee et al.

[11] 4,414,592

[45] Nov. 8, 1983

[54] SUPPORT FOR STABILIZING THE MOVEMENT OF A MAGNETIC MEDIUM OVER A MAGNETIC HEAD

[75] Inventors: Paul D. Losee, Layton; David G. Norton, Ogden, both of Utah

[73] Assignee: Iomega Corporation, Ogden, Utah

[21] Appl. No.: 259,698

[22] Filed: May 1, 1981

[51] Int. Cl.$^3$ .......................... G11B 5/60; G11B 5/22; G11B 17/32; G11B 15/64
[52] U.S. Cl. ..................................... 360/102; 360/99; 360/103; 360/122
[58] Field of Search ................ 360/102, 103, 99, 122, 360/129, 130

[56] References Cited

U.S. PATENT DOCUMENTS

| | | | |
|---|---|---|---|
| 3,872,507 | 3/1975 | Sano | 360/102 |
| 4,003,091 | 1/1977 | Wright | 360/102 |
| 4,074,330 | 2/1978 | Norton et al. | 360/102 |
| 4,316,278 | 2/1982 | Endter | 360/102 |
| 4,330,804 | 5/1982 | DeMoss | 360/102 |

*Primary Examiner*—R. Martin Kilgore
*Attorney, Agent, or Firm*—Woodcock, Washburn, Kurtz, Mackiewicz & Norris

[57] ABSTRACT

A coupler for a magnetic head includes a flat circumferential surface around the aperture in which the head is mounted and a circumferential orifice surface outside of and adjacent to the flat surface. The orifice surface forms a hydrodynamic orifice for control of flow of air over the flat circumferential surface to couple the magnetic medium to the magnetic head by the Bernoulli effect created by movement of air between the medium and the flat circumferential surface. The coupler protrudes through a flat Bernoulli plate against which the magnetic disk is rotated.

5 Claims, 4 Drawing Figures

SUPPORT FOR STABILIZING THE MOVEMENT OF A MAGNETIC MEDIUM OVER A MAGNETIC HEAD

BACKGROUND OF THE INVENTION

This invention relates to a supporting mount for a magnetic head, and more particularly, to a mount which stabilizes the movement of a magnetic disk in a magnetic disk drive.

Magnetic recording and playback at high densities in digital computer systems requires that a constant spacing be maintained between the record medium and the magnetic read/write head. In this type of magnetic recording, the magnetic head is separated from the magnetic record medium by an air bearing which must be of a constant height to maintain the proper resolution of the writing and reading on the record medium. Flexible recording mediums, such as "floppy" disks, tend to flutter at high speeds. This, and other factors, change the spacing and stability between the record medium surface and the magnetic head.

U.S. Pat. No. 4,003,091-Wright, recognizes the problems and provides as a solution a toroidal stabilizer having the convexshaped surface in close proximity to the moving magnetic media. The magnetic head is positioned in the aperture of the toroid and substantially closes this center hole, thereby blocking airflow. Because of this, a negative pressure is maintained at the center of the toroid and this urges the record medium toward the magnetic head. Maintenance of the negative pressure at the center of the toroid is critical. If there is a leak which opens the center to ambient pressure, the stabilizing effect is degraded.

One object of the present invention is to provide a stabilizer which is not as critical in maintaining negative pressure at the center of the toroid.

It is another object of the present invention to provide improved coupling characteristics for wider ranges of pitch, roll, and penetration of the magnetic read/write head with respect to the record medium.

Another object of the present invention is to generate high coupling forces for the stabilization of relatively stiff (3 mil) magnetic media.

U.S. Pat. No. 4,074,330-Norton, et al. shows a magnetic disk drive in which a rotating flexible disk is stabilized on a Bernoulli plate on which it is rotated. It is an object of the present invention to provide a stabilizer for use in a disk drive using a Bernoulli plate against which the disk is rotated.

RELATED APPLICATIONS WHICH ARE INCORPORATED BY REFERENCE

Applications Ser. No. 256,320, filed Apr. 22, 1981, Bauck, et al. and Ser. No. 256,594, filed Apr. 22, 1981 Bauck et al., show a magnetic disk drive and a disk drive cartridge of the type in which the present invention is particularly suitable for use. Application Ser. No. 259,706, filed May 1, 1981, Brower et al., shows a magnetic head which is suitable for use with the invention.

SUMMARY OF THE INVENTION

In accordance with the present invention, a magnetic head support mount includes a circumferential member, having a substantially flat surface on the side facing the record medium, around the aperture in which the magnetic head is mounted. A circumferential orifice surface is outside of and around the flat circumferential surface. This surface, coupled with a flexible media moving in close proximity to this surface, forms a hydrodynamic orifice for flow of air over the flat circumferential surface to couple the magnetic medium to the magnetic head by the Bernoulli effect which is created by movement of air between the medium and the flat surface. This coupling effect is not substantially dependent upon the blockage of air at the center of the "coupler" which, as previously mentioned, is susceptible to leakage. Furthermore, the coupling effect is relatively independent of the pitch, roll and penetration of the magnetic head with respect to the magnetic medium. The coupler of the present invention is preferably used in a magnetic disk drive to stabilize a flexible magnetic disk as it moves over a circular magnetic head mounted in the aperture of the coupler member. The magnetic head and support extend through an opening in a flat Bernoulli plate against which the magnetic disk is rotated. The magnetic disk is coupled to the head by first stabilizing the disk relative to the plate by the Bernoulli effect of air movement between the disk and the plate and then further stabilization between the disk and the coupler of the present invention.

The foregoing, and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
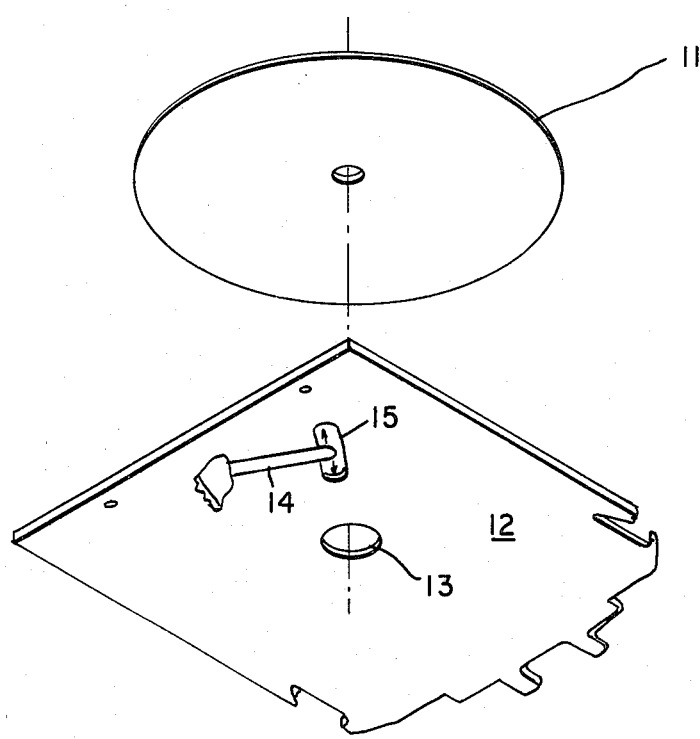
FIG. 1 shows a magnetic disk, Bernoulli plate and actuator of a disk drive to which the present invention is particularly applicable.

Referring to FIG. 1, the present invention is particularly applicable to magnetic disk drives in which a flexible magnetic disk 11 is rotated against a flat Bernoulli plate 12. The magnetic disk is engaged by a drive motor which extends through the hole 13 in the Bernoulli plate to engage the disk. In the example under consideration, a magnetic head is carried by the actuator arm 14 which travels in an arcuate path over the magnetic disk. The magnetic head and the coupler of the present invention extend through the arcuate hole 15 in the Bernoulli plate into read/write engagement with the magnetic disk 11.

Figure 2:
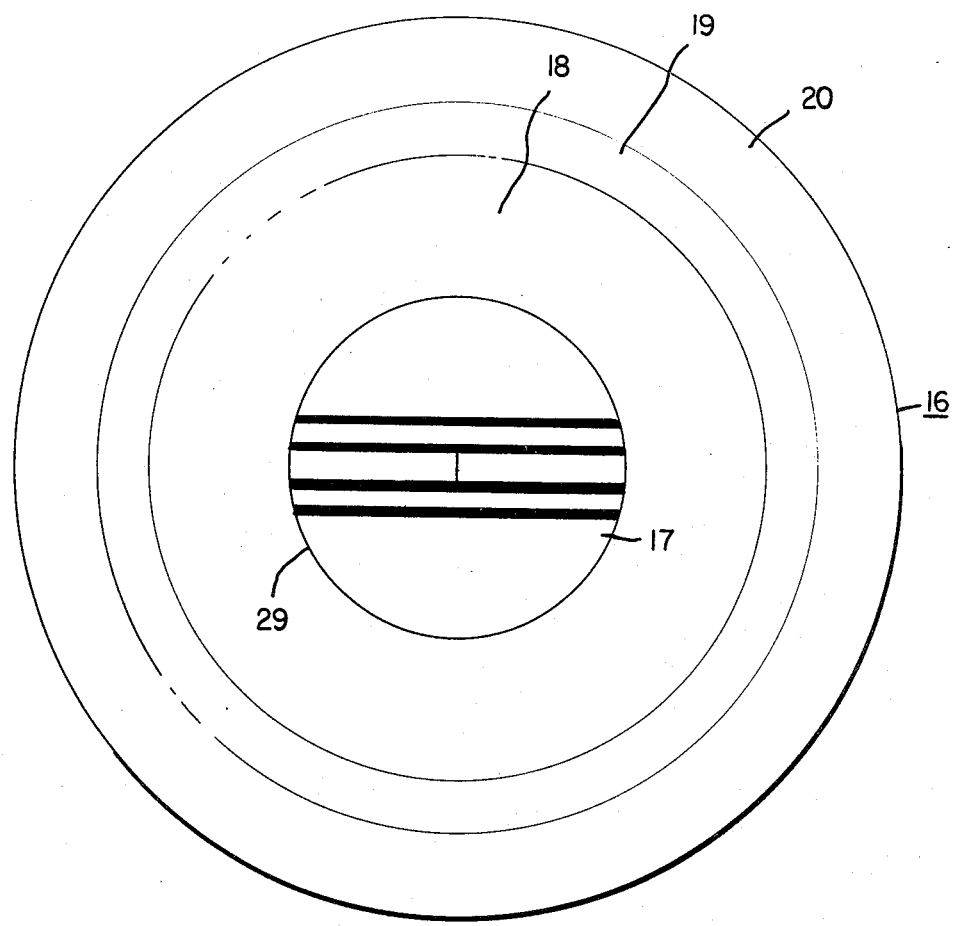
FIG. 2 is a top view of the magnetic head and support mount of the present invention.
Figure 3:
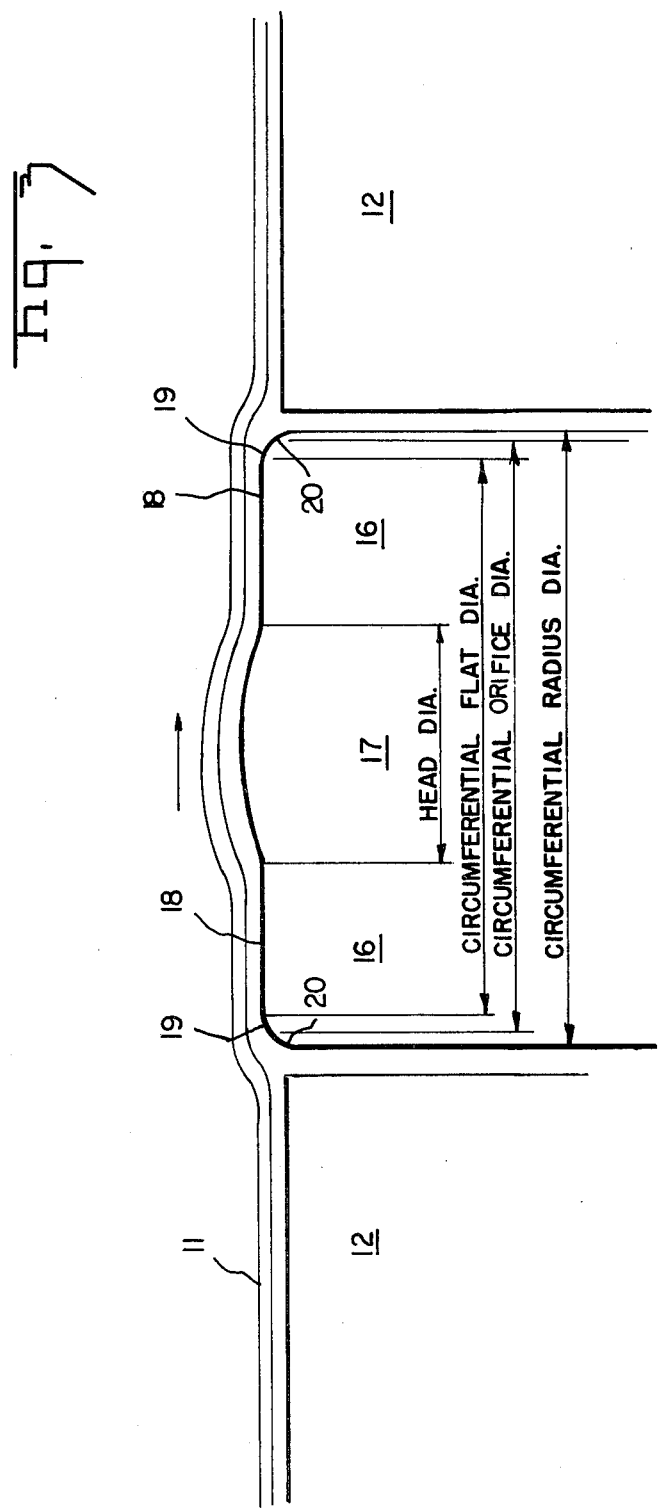
FIG. 3 is a cross-sectional view.

Referring to FIGS. 2 and 3, the magnetic head support mount of the present invention includes a coupler member 16. A magnetic head 17 is mounted in and protrudes slightly above an aperture in the coupler member 16. The magnetic head 17 may be of the type more fully described in the aforementioned Brower, et al. application. It is a penta rail type head with the four slots being shown as the dark lines across the circular head. The center rail constitutes the transducer which is positioned over the track on the magnetic disk for reading the data from the track.

The coupler member 16 has a flat circumferential surface 18 which extends around the aperture on the side of the coupler which faces the magnetic disk 11.

The circumferential surface 18 extends in a plane which is substantially parallel to the plane of rotation of the magnetic disk.

A circumferential orifice surface 19 extends outside of the flat circumferential surface 18. Circumferential orifice surface 19 is beveled away from the plane of rotation of the magnetic disk 11. This surface forms a hydrodynamic orifice which controls the airflow over the flat circumferential surface 18. This flow of air creates a Bernoulli effect which couples the magnetic disk to the flat circumferential surface 18.

A curved circumferential surface 20 extends around the coupler member 16 outside of the orifice surface 19. When the disk is loaded into the drive, the disk slides across the support mount. The curved surface 20 prevents damage to the disk during loading. Curved surface 20 also provides a gradual transition between the flat edge of the coupler member and the orifice surface 19.

As best shown in FIG. 3, the coupler 16, and head 17 protrude through an opening in the Bernoulli plate 12 against which the magnetic disk 11 is rotated. The disk is stabilized on the plate 12 by the Bernoulli effect of air movement between the disk and the plate. (It should be noted that the path of the disk 11 over the support mount and head is exaggerated in FIG. 3 as are relative dimensions of the head, support mount and Bernoulli plate.)

The coupler of the present invention utilizes a balance between the hydrodynamic orifice created by the orifice surface 19 and a Bernoulli coupling which is supplied by the flat surface 18. This combination of a hydrodynamic orifice and a Bernoulli coupling provides a wide range of advantages. The orifice surface 19 must be contoured to provide the desired hydrodynamic orifice. This contour is a function of the stiffness of the disk 11 and relative velocity of the disk to the support mount. The contour controls the amount of airflow over the flat surface 18. The coupling force supplied by this surface is a function of the orifice characteristics, the area of the flat surface 18 and the relative velocity between the disk and this surface. When the system is correctly balanced, it is not substantially sensitive to air leakage into the head region of the mount because the coupling force is achieved through Bernoulli coupling and not a hydrodynamic vacuum in the head region as was provided in the prior art. Also, this coupling provides greater insensitivity to coupler penetration, pitch and roll because the increased area of the surface 18 allows high resultant coupling forces but low unit loading forces which offers a wide range of load variation without affecting the head fly height, and hence, drag and wear. The coupler of the present invention is particularly suitable for use with the Bernoulli plate 12 which provides the primary stabilization for the disk 11.

Figure 4:
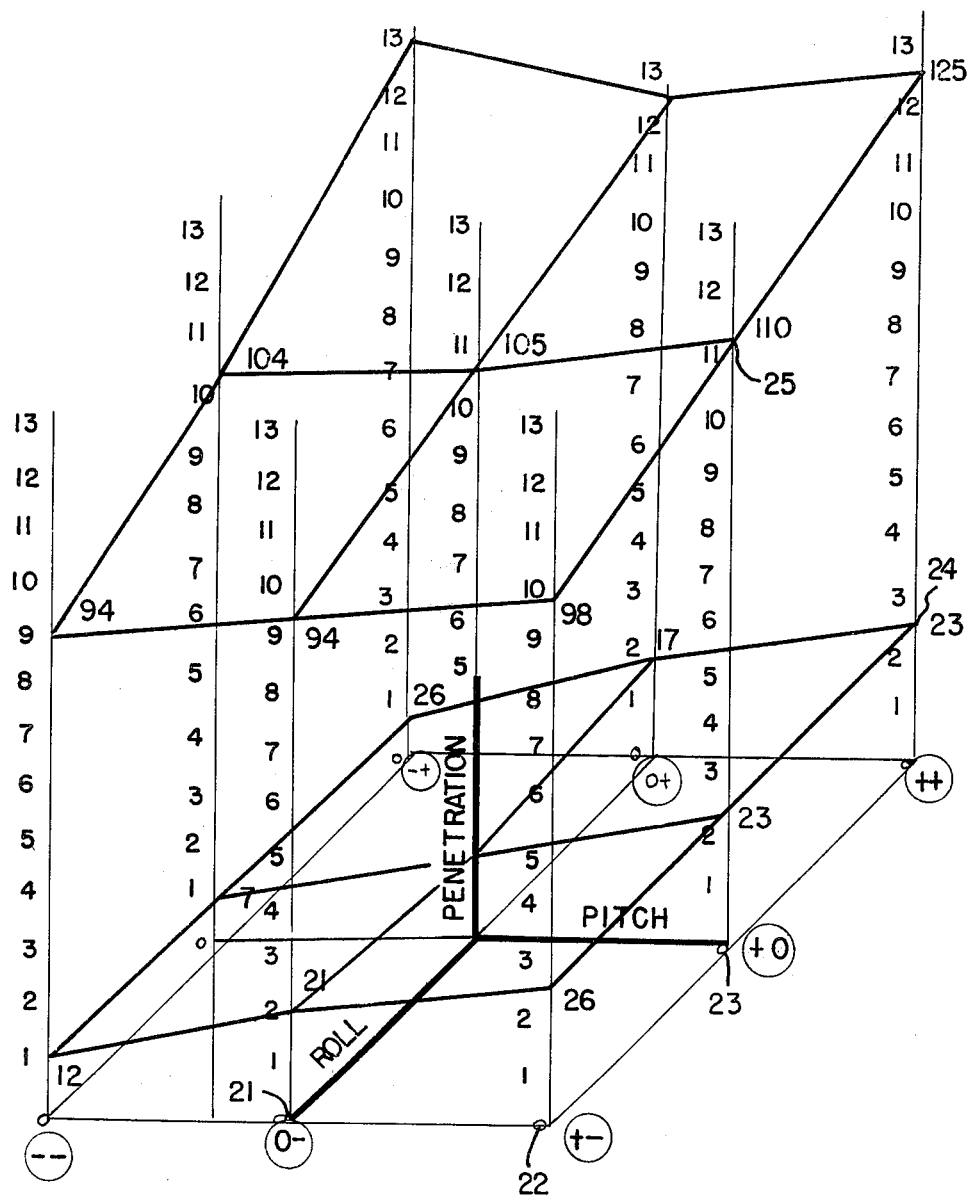
FIG. 4 shows the improved coupling through a wide range of pitch, roll and penetration of the magnetic head.

The improvement in head coupling over a wide range of head pitch, roll and penetration is demonstrated by the test results shown in FIG. 4. In this figure, positive and negative pitch up to ±0.35° is shown along the X axis, positive and negative roll up to ±0.35° is shown along the Y axis and penetration of the head above the Bernoulli plate surface in tenths of millimeters is shown along the Z axis. To understand the figure, observe that the point 21 represents a pitch of zero, a roll of −0.35° and a penetration of 0; the point 22 represents a pitch of +0.35°, a roll of −0.35°, and a penetration of 0. The point 23 represents a pitch of +0.35°, roll of 0 and a penetration of 0; and so on. Good coupling was obtained for all points between the two planes outlined by heavy lines. For example, one point at the extremity at which coupling was obtained is the point 24 which represents a pitch +0.35°, a roll of +0.35°, and a penetration of 0.23 mm. The point 25 also is at the extreme of coupling. It represents a pitch of 0.35°, a roll of 0°, and a penetration of 1.1 mm.

The tests of FIG. 4 were performed on a support mount and head having the following particulars: The hub penetration, which is the spacing between the disk 11 and the Bernoulli plate 12 at the circumference of hole 13, was 0.2 mm. The diameter of the circumferential flat surface was 5.7 mm, the radius of curvature of the head was 40 mm; the penetration of the head above the support mount was 0.02 mm; the radius on the disk at which the test was done was 60 mm. The test was performed on a standard 3 mil coated floppy disk with a 15 mm inside diameter. The disk was rotating at 1500 rpm.

While a particular embodiment of the invention has been shown and described, various modifications are within the true spirit and scope of the invention. The appended claims are, therefore, intended to cover all such modifications.

What is claimed is:

1. A magnetic head coupler which stabilizes the movement of a magnetic record medium in relation to said head comprising:
    a circumferential member having an aperture in which said magnetic head is supported;
    a flat circumferential surface on said member around said aperture on the side facing said record medium and extending in a plane substantially parallel to the plane of rotation of said medium; and
    a circumferential orifice surface outside of and around said flat circumferential surface, and extending from said flat surface away from said plane of rotation of said record medium, said orifice surface forming an orifice for airflow control over said flat circumferential surface to couple said magnetic medium to said magnetic head by the Bernoulli effect created by movement of air between said medium and said flat circumferential surface.

2. The head support recited in claim 1 further comprising:
    a curved surface around the edge of said coupler member and outside of said orifice surface on the side facing said record medium.

3. An assembly for a magnetic disk drive comprising:
    a circular magnetic head having a magnetic transducer as part of a read/write surface of said magnetic head which is positioned for reading and writing on a magnetic disk, and a magnetic gap across said transducer;
    a coupler member having a circular aperture in which said head is supported, said read/write surface of said magnetic head protruding from said coupler member, said coupler member having a flat circumferential surface on said member around said aperture on the side facing said record medium and extending in a plane substantially parallel to the plane of rotation of said medium; and
    a circumferential orifice surface outside of and adjacent to said flat circumferential surface, and extending from said flat surface away from said plane of rotation of said record medium, said orifice surface forming an orifice for control of flow of air over said flat circumferential surface to couple said magnetic medium to said magnetic head by the Bernoulli effect created by movement of air between said medium and said flat circumferential surface.

4. The assembly recited in claim 3 further comprising: a flat Bernoulli plate against which said magnetic disk is rotated, said coupler and said head protruding through said plate with said disk being coupled to said coupler and stabilized on said plate by the Bernoulli effect of air movement between said disk and said plate with said coupler and head protruding therefrom.

5. The assembly recited in claim 3 further comprising: a curved surface around the edge of said coupler member and outside of said orifice surface on the side facing said record medium.

* * * * *